(12) United States Patent
Eckardt et al.

(10) Patent No.: US 6,913,719 B2
(45) Date of Patent: Jul. 5, 2005

(54) DEVICE AND PROCESS FOR INJECTION MOLDING OF HOLLOW PLASTIC PARTS

(75) Inventors: Helmut Eckardt, Meinerzhagen (DE); Stephan van der Steen, Kierspe (DE); Marc Wülfrath, Kierspe-Vollme (DE); Rolf Schwesinger, Meinerzhagen (DE); Norbert Bielich, Kreuztal (DE)

(73) Assignee: Battenford GmbH, Meinerzhagen (DE)

( * ) Notice: Subject to any disclaimer, the term of this patent is extended or adjusted under 35 U.S.C. 154(b) by 371 days.

(21) Appl. No.: 10/106,885

(22) Filed: Mar. 22, 2002

(65) Prior Publication Data

US 2002/0158372 A1 Oct. 31, 2002

(30) Foreign Application Priority Data

Mar. 23, 2001 (DE) .......................................... 101 14 414

(51) Int. Cl.[7] .............................................. B29D 22/00
(52) U.S. Cl. ...................... 264/40.3; 264/570; 264/572; 425/130; 425/145; 425/146
(58) Field of Search ................ 264/40.3, 570, 264/572; 425/130, 145, 146

(56) References Cited

U.S. PATENT DOCUMENTS

| | | | |
|---|---|---|---|
| 4,101,617 A | 7/1978 | Friederich | 264/93 |
| 5,139,714 A | 8/1992 | Hettinga | 264/45.1 |
| 5,198,240 A | 3/1993 | Baxi | 425/145 |
| 5,505,891 A * | 4/1996 | Shah | 264/28 |
| 5,928,677 A | 7/1999 | Gosdin | 425/130 |
| 6,579,489 B1 * | 6/2003 | Thomas | 264/570 |

FOREIGN PATENT DOCUMENTS

| | | |
|---|---|---|
| DE | 28 00 482 A1 | 6/1978 |
| DE | 27 16 817 A1 | 8/1978 |
| DE | 93 16 984 U1 | 1/1994 |
| DE | 196 13 134 A1 | 10/1997 |
| DE | 199 03 682 A1 | 8/2000 |
| EP | 0 467 201 A2 | 1/1992 |
| GB | 2 322 094 | 8/1998 |
| JP | 5-261750 | 10/1993 |
| JP | 10-156856 | 6/1998 |
| JP | 2001-047472 | 2/2001 |

OTHER PUBLICATIONS

"Testing the water," *European Plastics News*, pp. 35–36 (Nov. 1999).
Michaeli, W., et al., "Gas oder Wasser?", KU *Kunststoffe*, vol. 89, pp. 56–58 and 60, 62 (1999).
Michaeli, W., et al., "Gas geben mit Wasser," KU *Kunststoffe*, vol. 89, pp. 84 and 86(1999).
Michaeli, W., et al., "Kühlzeit reduzieren mit der Wasser–Injektionstechnik," KU *Kunststoffe*, vol. 90, pp. 67–72 (2000).

* cited by examiner

*Primary Examiner*—Suzanne E. McDowell
(74) *Attorney, Agent, or Firm*—Hamilton, Brook, Smith & Reynolds, P.C.

(57) ABSTRACT

Device and process for injection molding of molded parts made from plastic material having at least one cavity, which has means for injecting plastic melt into the cavity of an injection-molding die along a melt flow path and means for injecting a fluid into the still molten plastic material, wherein the means for injecting a fluid are designed in order to inject a liquid at preset pressure and preset quantity. Provision is made in that the means for injecting a liquid includes a first part element, which is arranged centrally and remote from the injection-molding die and supplies at least one injection-molding die, and includes at least one second part element, which is arranged in the immediate vicinity of the injection-molding die, and a third part element, which is arranged locally on the injection-molding die at least during injection of the liquid.

19 Claims, 7 Drawing Sheets

DEVICE AND PROCESS FOR INJECTION MOLDING OF HOLLOW PLASTIC PARTS

RELATED APPLICATION

This application claims priority to German Application 101 14 414.8, filed Mar. 23, 2001, the entire teachings of which are incorporated herein by reference.

BACKGROUND OF THE INVENTION

A device for injection molding is known from KU Kunststoffe (1999), where in an article by IKV-Aachen, "Adding gas with water", a device is described, in which one or more hydropumps inject the water into the flowable melt and produce a cavity. The water then flows through the cavity thus provided. Provision is thus made to be able to circulate the water.

SUMMARY OF THE INVENTION

The disadvantage of the design of the device above is the direct integration of the water injection device on the injection-molding die.

One aspect of the invention is therefore to further develop a known device of the type that the fluid injection device can serve several injection-molding dies or injection-molding machines.

In one embodiment, the means for injecting a liquid includes a first part element, which is arranged centrally and remote from the injection-molding die and supplies at least one injection-molding die, and includes at least one second part element, which is arranged in the immediate vicinity of the injection-molding die, and a third part element, which is arranged locally on the injection-molding die at least during injection of the liquid.

Due to this arrangement it is possible to provide the required quantity of a liquid at adequate pressure in a first part element. The actual regulation and addition of the liquid takes place via the part elements two and three, which can be assigned in each case to only one cavity.

It has been shown in tests that it is favorable to design the first part element as a reservoir for liquids. However, it is also conceivable to effect the first part element from a supply pipe for liquid, in one embodiment from the water supply utility, when the pressure increase takes place in the second part element.

Good results can also be achieved when the liquid is tempered. Provision is thus made to manufacture the first part element from at least one reservoir for liquid and a ring pipe.

By way of further development, the first part element includes at least one first reservoir for liquid and a second reservoir for compressed gas, for example, nitrogen. However, two reservoirs can also be for liquids, wherein they have different liquid temperatures. The first part element, regardless of which design, is equipped with suitable means for increasing the pressure of the liquid.

The second part element is, for example, a device for the control and/or regulation of the fluid pressure and the third part element is a fluid injection element. The second part element is advantageously at least one pressure-regulating module. However, a store can also additionally be integrated, so that the device for the control and/or regulation of the fluid pressure includes a pressure-regulating module and a liquid store or a combined liquid/gas store. A pump as means for increasing pressure can be arranged upstream of the overall device for the control and/or regulation of the fluid pressure in order to provide adequate pressure and quantity of liquid. This is particularly advantageous if a reservoir is not provided as the first part element.

In order to bring the liquid to a required temperature, the first part element and/or the second part element may have tempering means. They can be arranged, for example, at the inlet and/or at the outlet of the second part element, but may also be integrated into the components of the first part element.

At least one mixing fixture, with which the liquid to be injected into the injection-molding die is mixed to a required temperature, is arranged between the at least two liquid reservoirs and the particular injection-molding die.

The proposed process for injection molding of molded parts made from plastic material having at least one cavity, includes: a) injection of plastic melt into the cavity of an injection-molding die from an injection unit along a melt flow path, b) injection of a fluid into the still molten plastic material, so that the latter is pressed against the walls of the cavity, c) allowing the plastic material to solidify until it forms the molded part in self-supporting manner, d) releasing the molded part from the cavity of the injection-molding die, wherein a liquid is used as the fluid, which is injected at preset pressure and preset quantity.

Provision is thus made according to one embodiment of the invention in that the liquid is passed from a first part element of a means for injecting the liquid, which is arranged centrally, via a second part element of the means for injecting the liquid, which is arranged in the vicinity of the injection-molding die, to a third part element of a means for injecting the liquid, which is arranged locally on the injection-molding die, and is injected by the latter into the plastic melt.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of various embodiments of the invention follows.

Figure 1:
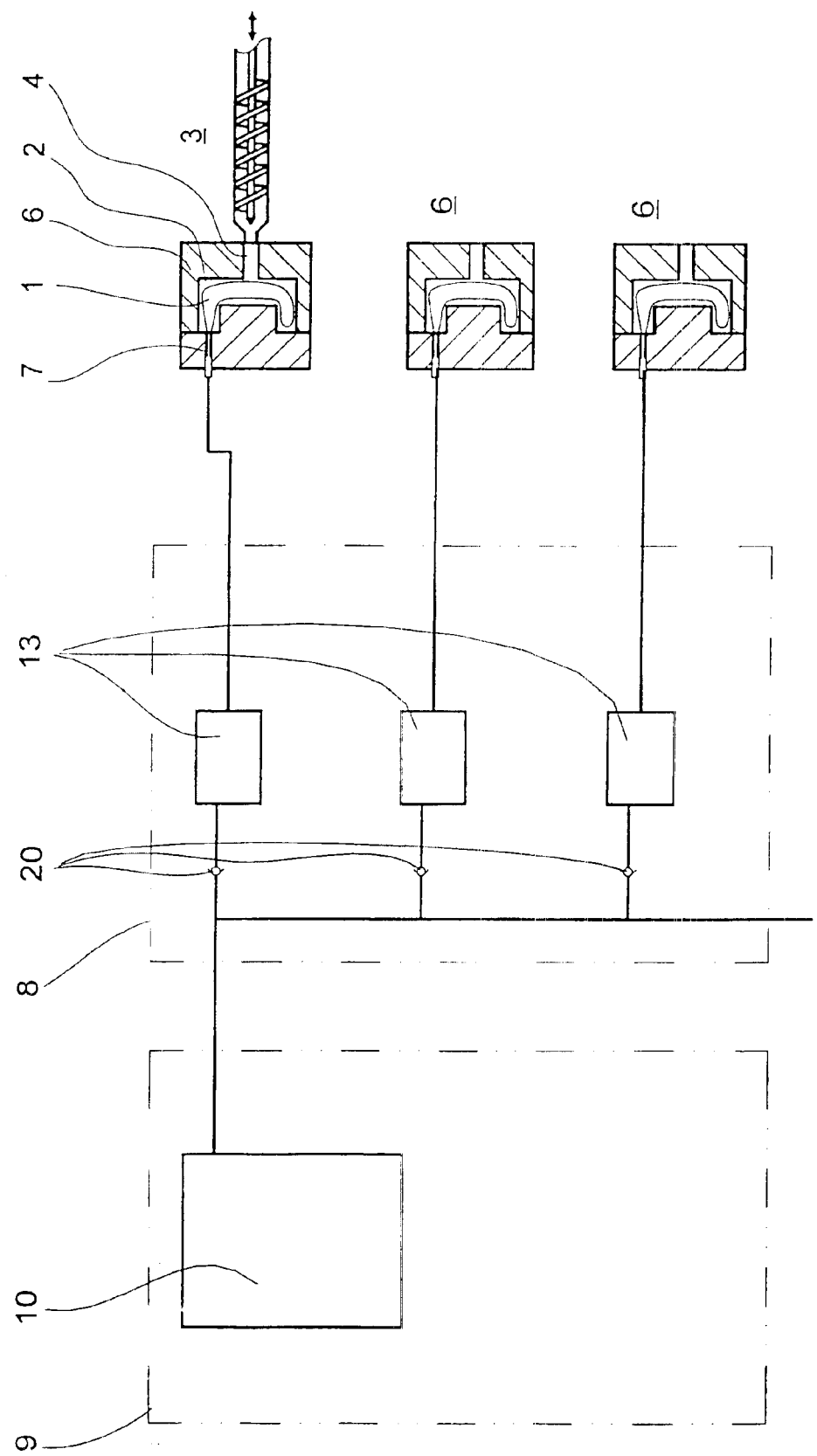
FIG. 1 shows schematically the arrangement of the three part elements with a reservoir and pressure-regulating module.

FIG. 1 shows schematically an injection unit 3, through which plastic melt is injected into an injection-molding die 6 along a melt flow path 4. Further injection-molding dies 6 are only indicated, wherein the particular associated injection unit 3 is not shown. Liquid is injected via a liquid reservoir 10, which serves as first part element 9, into the plastic melt along a second part element 8, includes a pressure-regulating module 13, via a fluid injection nozzle 7, as third part element, in order to form the cavity 1 in the molded part 2.

Figure 2:
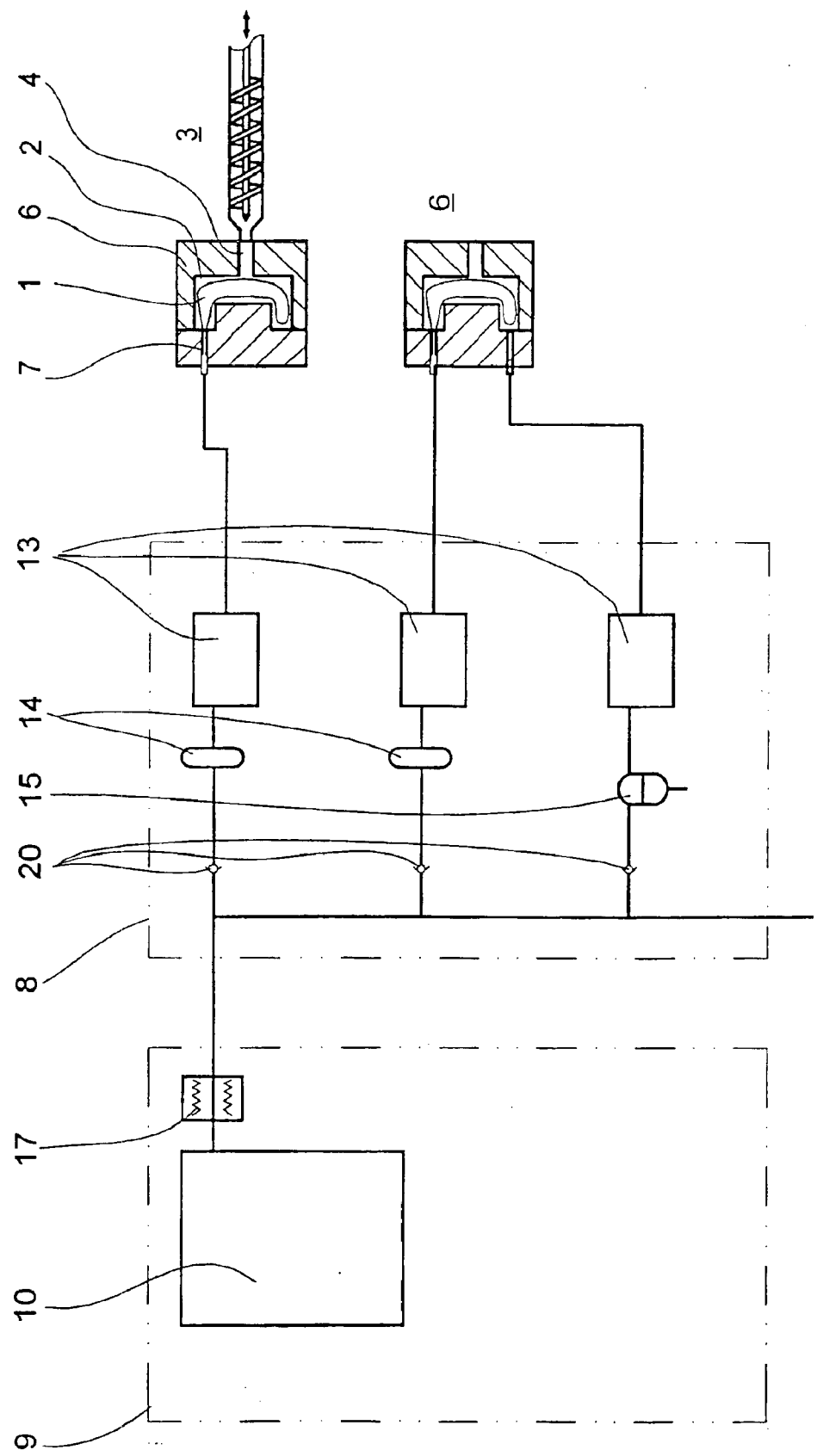
FIG. 2 corresponds to FIG. 1 with additional liquid store and tempering and alternative die connection.

FIG. 2 shows an alternative design of the device. A store is integrated in the second part element 8, wherein here a pure liquid store 14 or, as shown in the lower part of the figure, a combined liquid/gas store 15 may be used. It is thus possible to additionally influence the liquid pressure. Also, a large quantity of liquid may be provided via the store, even if the supply via the first part element 9 is interrupted for example. A pressure drop is avoided via the combined liquid/gas store 15, since the pressure of the liquid is kept constant via the gas cushion. Furthermore, FIG. 2 shows a variant, in which two cavities 1 are supplied in an injection-molding die 6.

Figure 3:
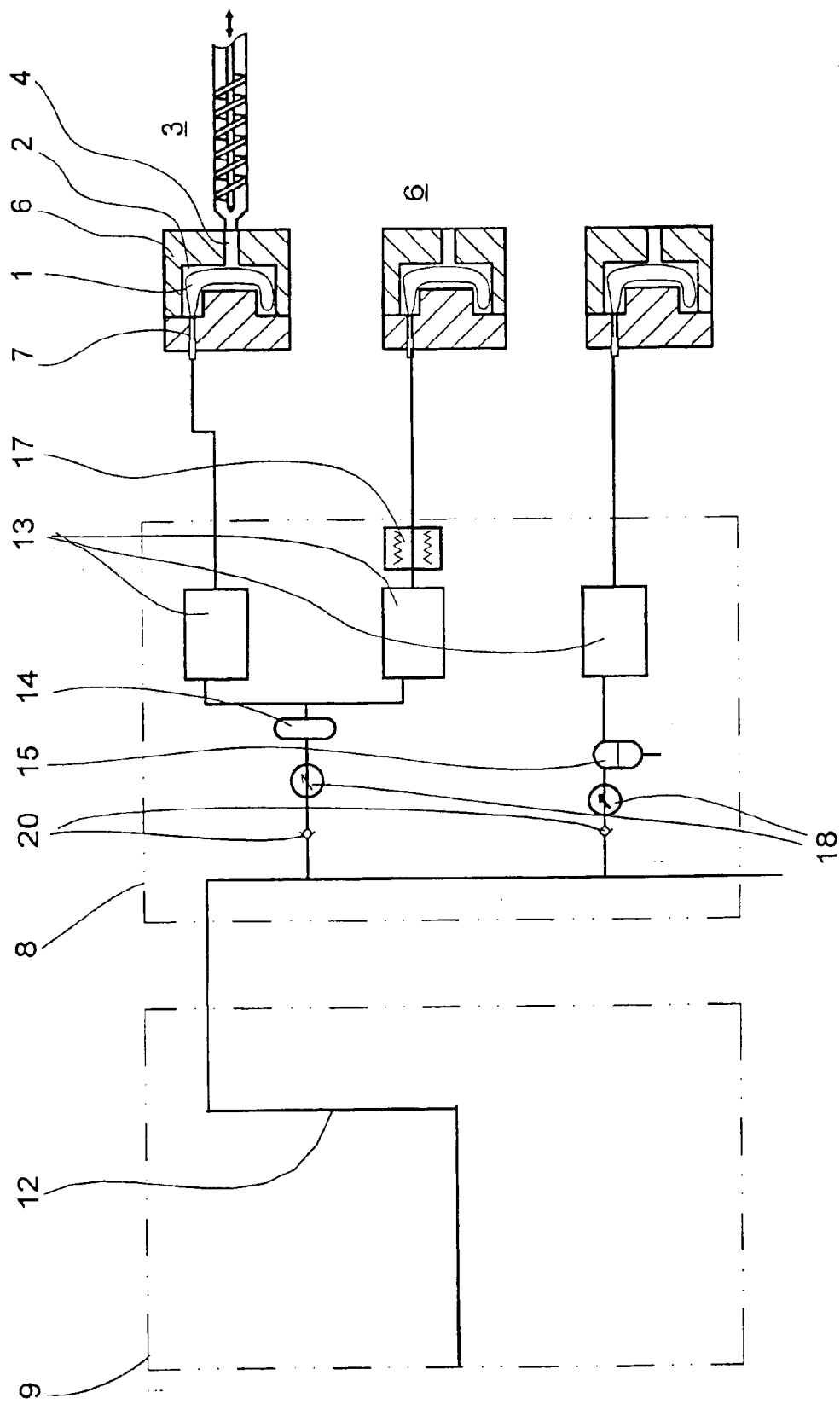
FIG. 3 corresponds to FIG. 1 without reservoir, but with pressure regulation, upstream pressure increase, store and alternative liquid pipe.

The design of the device according to FIG. 3 utilizes the liquid pressure, as it is provided by the supply utilities. In order to be able to influence the liquid pressure, in the second part element 8, in addition to the storage possibilities according to FIG. 2, a device for increasing pressure, here a pump 18, is connected upstream of each control line of equal pressure. It is assumed here that the same pressure is required in the upper and central control line, so that a store 14 and a pump 18 supplies two pressure-regulating modules 13. A tempering means 17 is shown on the end of the central control line by way of example for the possibility of tempering.

Figure 4:
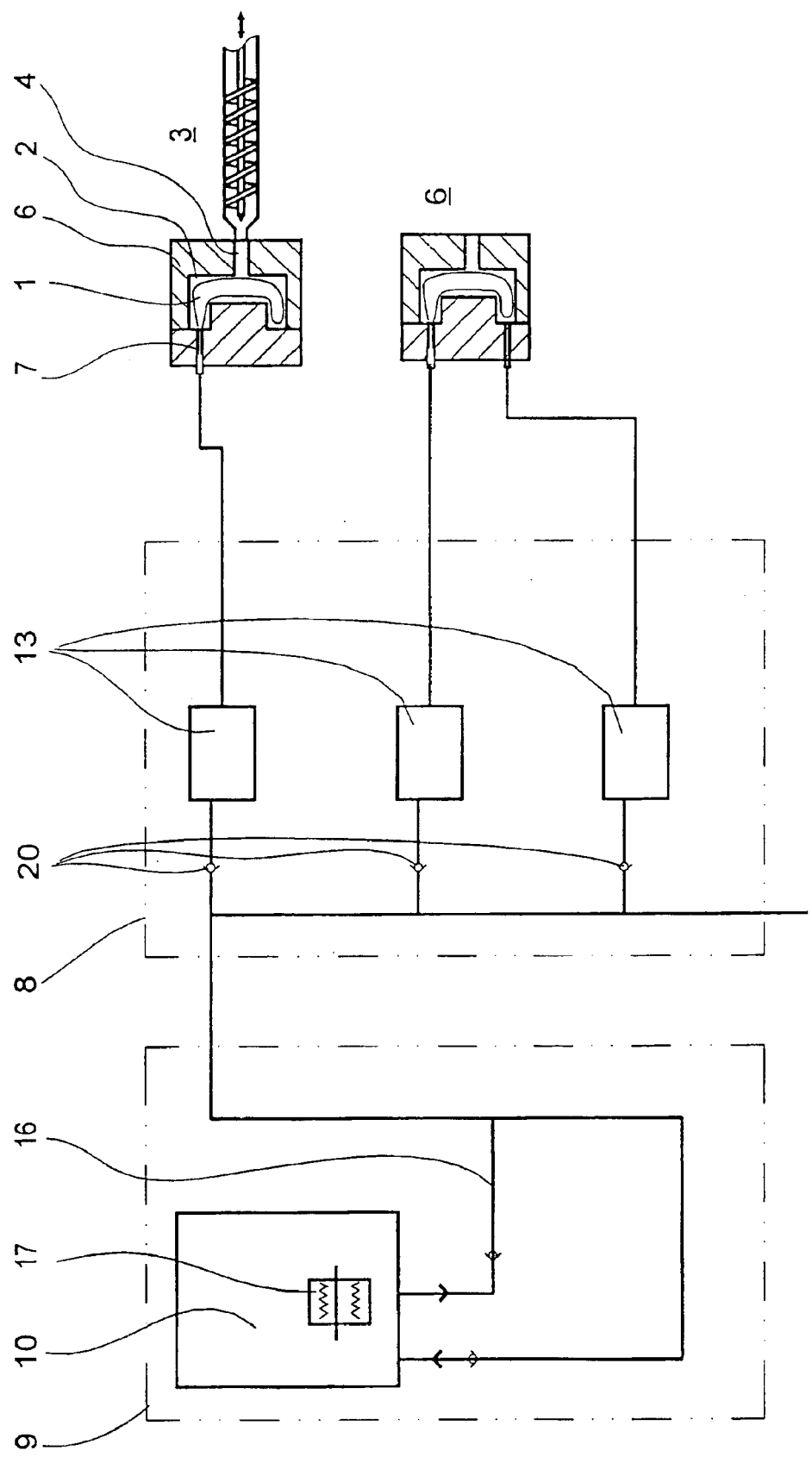
FIG. 4 corresponds to FIG. 1 with a ring pipe and die connection according to FIG. 2.

If tempering means 17 is accommodated in the first part element 9, as shown in FIG. 4, it is possible to allow the tempered liquid to circulate in a ring pipe 16, in order to prevent cooling or heating. However, it is also conceivable to arrange the tempering means 17 upstream of each control line in the second part element 8, in order to provide different temperatures of the liquid for each die 6 or cavity 1. The alternative die connection of the control lines according to FIG. 2 is likewise possible here.

Figure 5:
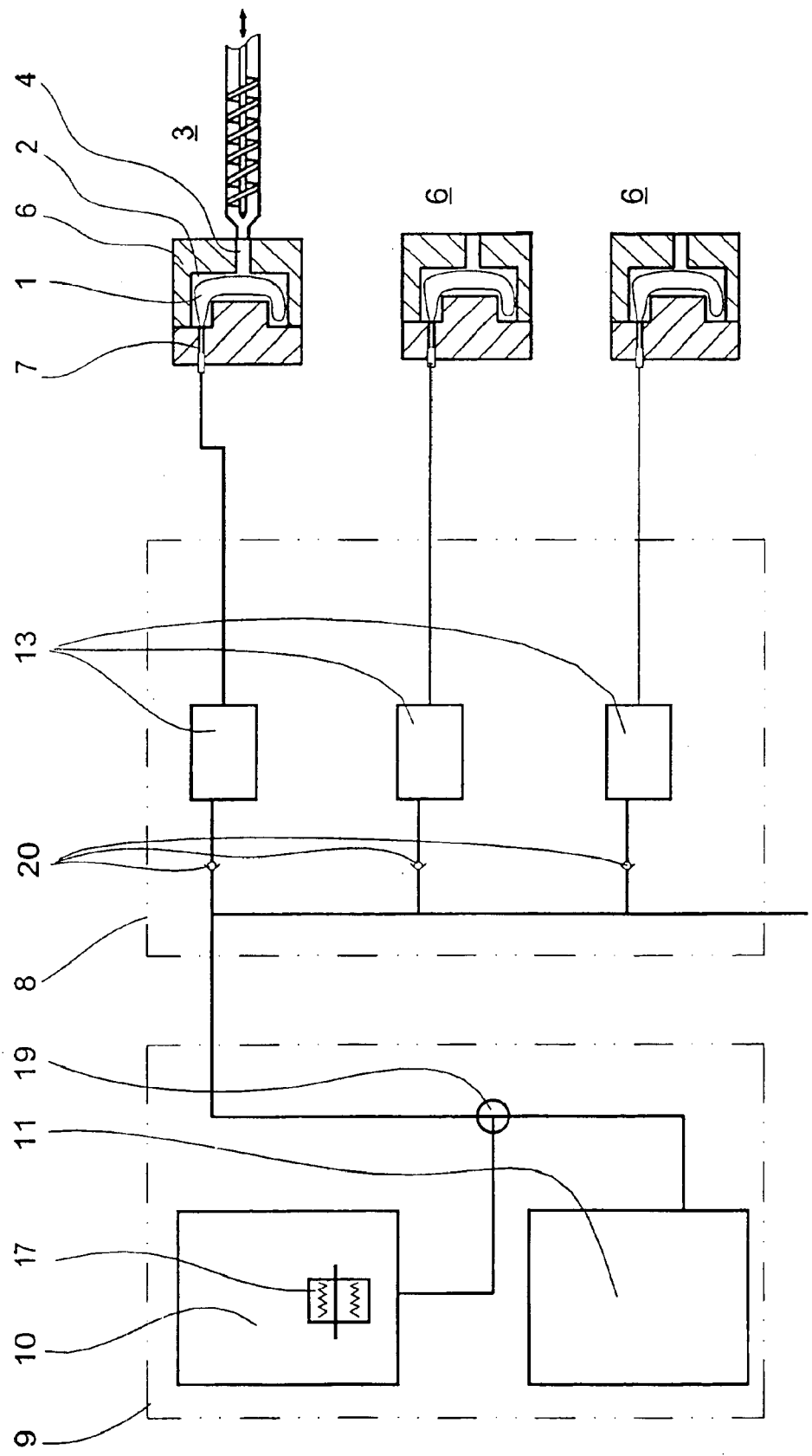
FIG. 5 corresponds to FIG. 1 with two liquid reservoirs.
Figure 6:
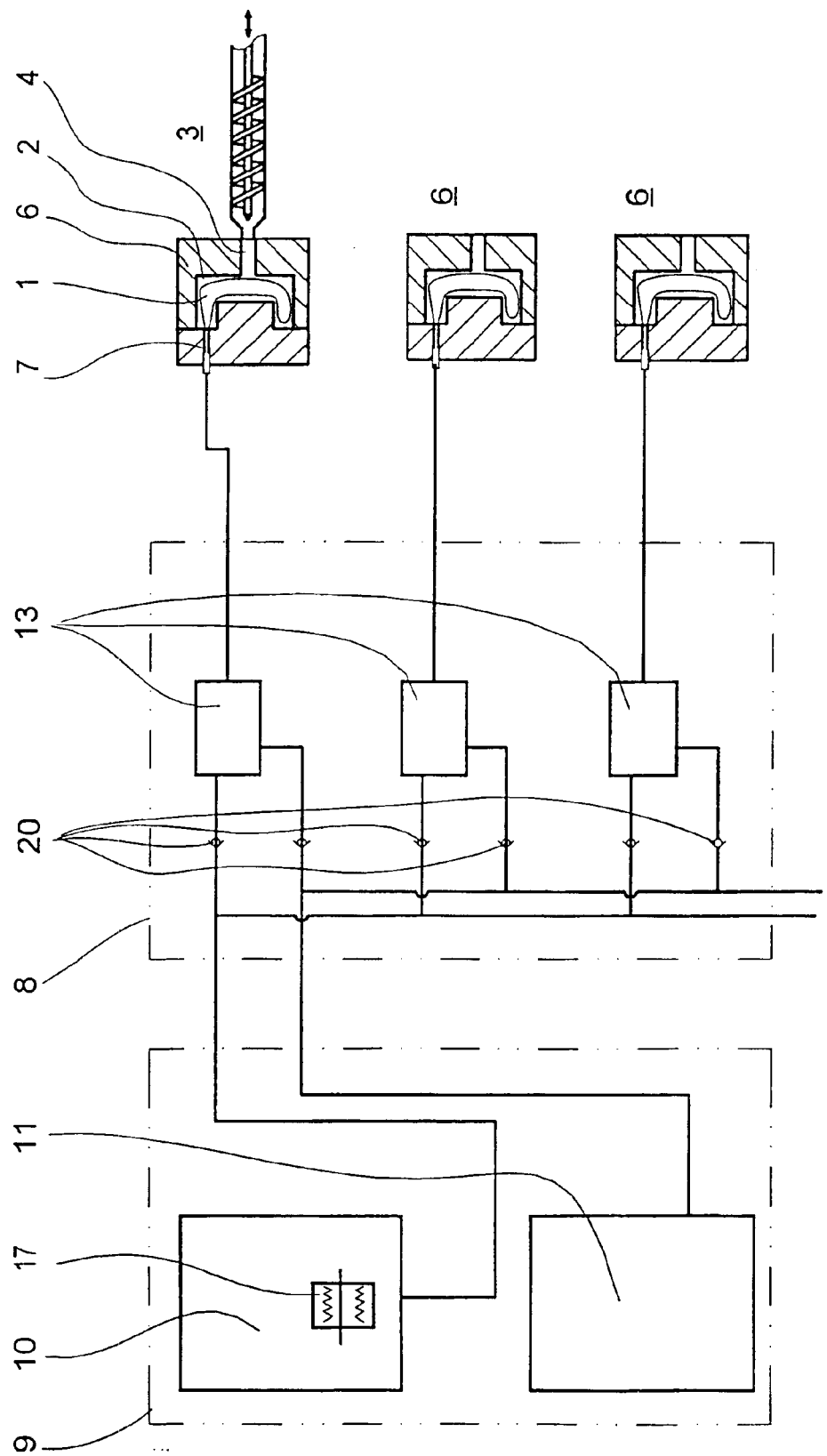
FIG. 6 corresponds to FIG. 1 and FIG. 5, but with a compressed gas reservoir.

FIG. 5 shows a further alternative. Here, the first part element 9 includes two reservoirs. Heated liquid is provided in the first reservoir 10, and cold or cooled liquid in the second reservoir 11. The required temperature of the liquid is mixed via the mixing fixture 19 and conveyed to the second part element 8. However, it is also conceivable to provide a compressed gas, for example nitrogen, in the second reservoir 11 and likewise to mix via the mixing fixture 19. However, mixing of the two liquids at different temperature only in the second part element 8 is also provided in the device of the invention. A design according to FIG. 6 is useful for this. In the first part element 9, liquid is provided via a first reservoir 10 and compressed gas, for example nitrogen, or liquid at a temperature which differs from the temperature of the liquid from the first reservoir 10, via a second reservoir 11. Both lines are supplied to a pressure-regulating module 13 in the second part element 8 via different media pipes. In the pressure-regulating module 13, the two media pipes may be released at the same time, one after another or separately from one another. Hence, each required temperature of the liquid to be added may be mixed, but also a mixture of liquid and gas may be produced. If the compressed gas line is released after adding the liquid, the pressure to the cavity 1 may be additionally increased or the liquid may be removed again from the cavity by means of compressed gas.

All variations of the exemplary embodiments shown in the figures can be combined with one another, so that still further designs of the devices are produced. Hence, it is for example conceivable to provide three reservoirs in the first part element 9 and thus to obtain a combination of the designs according to FIGS. 5 and 6, that is mixing of cold, warm liquid and/or compressed gas.

Figure 7:
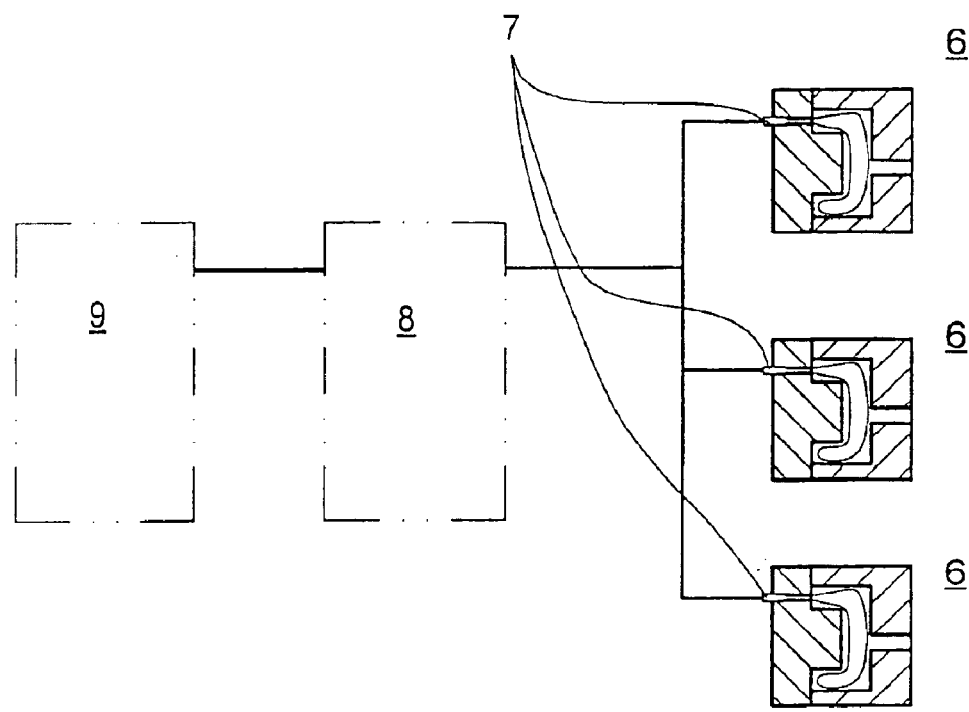
FIG. 7 shows a further alternative for the die connection.

The distribution after the second part element 8 to the assigned dies may likewise be designed in variable manner. FIG. 7 shows one example, in which multiple distribution to three injection-molding dies 6 is realized by one of the control lines from the second part element 8.

Figure 8:
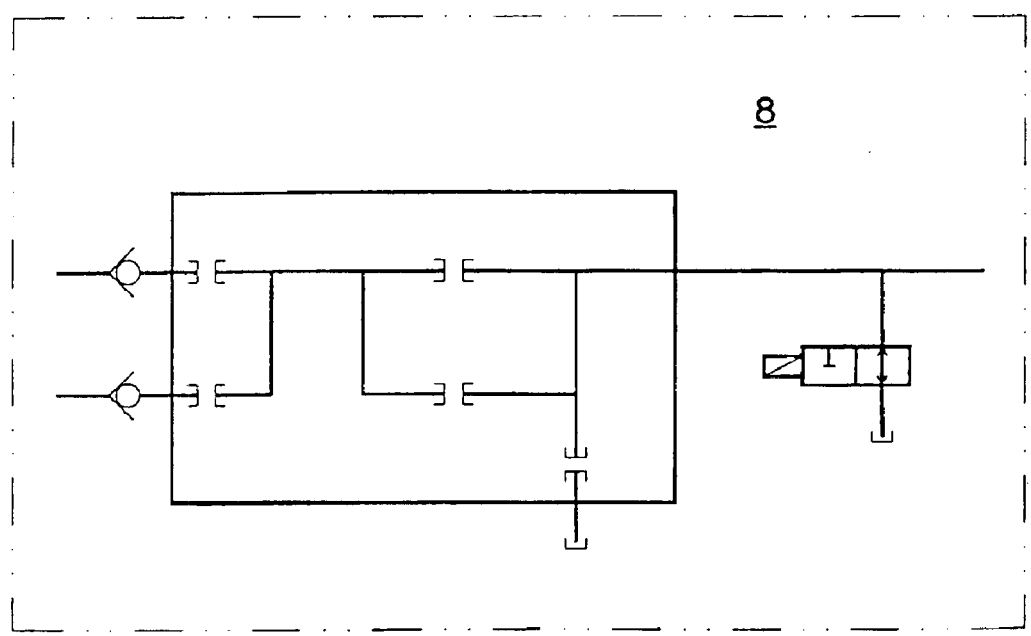
FIG. 8 shows one example of a circuit arrangement according to FIG. 6.

Non-return valves 20 are arranged between all branching media lines, as shown in all figures. Furthermore, control elements, such as valves, distributing valves or further non-return valves can be installed in the individual media pipes for better control and regulation. An exemplary embodiment of a pressure-regulating module 13 as a control/regulating valve is shown in FIG. 8.

Provision is made as a particularly advantageous further development, to accommodate the second part element 8 to each assigned cavity 1 in a housing and thus to provide a modular construction of the device.

While this invention has been particularly shown and described with references to preferred embodiments thereof, it will be understood by those skilled in the art that various changes in form and details can be made therein without departing from the scope of the invention encompassed by the appended claims.

What is claimed is:

1. Device for injection molding of molded parts made from plastic material having at least one cavity, which has means for injecting plastic melt into a cavity of an injection-molding die along a melt flow path, and means for injecting a fluid into the still molten plastic material, wherein the means for injecting the fluid are designed in order to inject a liquid at preset pressure and preset quantity, the means for injecting a liquid including a first part element which is arranged centrally and remote from the injection-molding die and supplies at least one injection-molding die, and including at least one second part element, which is arranged in the immediate vicinity of the injection-molding die, and a third part element, which is arranged locally on the injection-molding die at least during injection of the liquid, the plastic melt being injected into a first opening in the injection-molding die and the fluid being injected into a second opening in the injection-molding die.

2. Device according to claim 1, wherein the second and third part element are assigned in each case to only one cavity.

3. Device according to claim 1, wherein the first part element has at least one reservoir for liquids.

4. Device according to claim 1, wherein the first part element is a supply pipe for liquid.

5. Device according to claim 1, wherein the liquid includes water.

6. Device according to claim 1, wherein the first part element includes at least one reservoir for liquid and a ring pipe.

7. Device according to claim 1, wherein the first part element includes at least one first reservoir for liquid and a second reservoir for compressed gas.

8. Device according to claim 7, wherein the gas includes nitrogen.

9. Device according to claim 1, wherein the second part element is a device for the control and/or regulation of the fluid pressure and the third part element is a fluid injection element.

10. Device according to claim 9, wherein the second part element includes at least one pressure-regulating module.

11. Device according to claim 10, wherein the device for the control and/or regulation of the fluid pressure includes a pressure-regulating module and a liquid store.

12. Device according to claim 10, wherein the device for the control and/or regulation of the fluid pressure includes a pressure-regulating module and a combined liquid/gas store.

13. Device according to claim 11, wherein a pump is arranged upstream of the device for the control and/or regulation of the fluid pressure in order to increase the pressure.

14. Device according to claim 1, wherein the first part element and/or the second part element have tempering means, with which the liquid can be brought to the required temperature.

15. Device according to claim 14, wherein at least one mixing fixture, with which the liquid to be injected into the injection-molding die is mixed to a required temperature, is arranged between the at least two liquid reservoirs and the injection-molding die.

16. Process for injection molding of molded parts made from plastic material having at least one cavity, which includes:
　a) injection of plastic melt into the cavity of an injection-molding die from an injection unit along a melt flow path and through a first opening in the injection-molding die
　b) injection of a fluid into the still molten plastic material, so that the latter is pressed against the walls of the cavity, the fluid being injected into a second opening in the injection-molding die;
　c) allowing the plastic material to solidify until it forms the molded part in self-supporting manner; and
　d) releasing the molded part from the cavity of the injection-molding die;

liquid being used as the fluid, which is injected at a preset pressure and a preset quantity, the liquid passing from a first part element of a means for injecting the liquid, which is arranged centrally, via a second part element of the means for injecting the liquid, which is arranged in the vicinity of the injection-molding die, to a third part element of a means for injecting the liquid, which is arranged locally on the injection-molding die, and is injected by the latter into the plastic melt.

17. Device for injection molding parts made from a plastic material, comprising:
　an injection unit for injecting plastic melt into a first opening in an injection-molding die; and
　a liquid injection unit for injecting a liquid into a second opening in the injection-molding die, including:
　　a first part element disposed remotely from the injection-molding die;
　　at least one second part element disposed in the immediate vicinity of the injection-molding die; and
　　a third part element disposed locally on the injection-molding die at least during injection of the liquid.

18. Process for injection molding to form a molded part, comprising:
　injecting plastic melt into a first opening in an injection-molding die; and
　injecting a liquid into a second opening in the injection-molding die, the liquid passing from a first part element of a liquid injection unit, the first part element being disposed remotely from the injection-molding die, through a second part element of the liquid injection unit disposed in the immediate vicinity of the injection-molding die, and injected into the injection-molding die by a third part element of the liquid injection unit disposed locally on the injection-molding die.

19. Process according to claim 18, wherein the liquid is injected into the injection-molding die while the plastic melt is still melted to push the plastic melt against at least one wall of the injection-molding die to form at least one cavity in molded part.

* * * * *